(12) United States Patent  (10) Patent No.: US 6,523,780 B2
Stocker  (45) Date of Patent: Feb. 25, 2003

(54) MULTI-CARRIER PHEROMONE CARRYING SUBSTRATE DISPENSER, APPARATUS DISTRIBUTION SYSTEM

(76) Inventor: Russell Stocker, 3412 Laguna Ave., Davis, CA (US) 95616

( * ) Notice: Subject to any disclaimer, the term of this patent is extended or adjusted under 35 U.S.C. 154(b) by 0 days.

(21) Appl. No.: 09/888,877

(22) Filed: Jun. 23, 2001

(65) Prior Publication Data

US 2002/0194771 A1 Dec. 26, 2002

(51) Int. Cl.$^7$ ................................................ B64D 1/00
(52) U.S. Cl. ........................ 244/136; 43/132.1; 43/107; 221/232; 221/136; 424/410
(58) Field of Search ............................... 244/136, 137.1, 244/137.4; 43/107, 131, 132.1, 118, 122, 113, 119; 116/209; 221/227, 232, 131; 424/405, 409, 410

(56) References Cited

U.S. PATENT DOCUMENTS

| | | | | |
|---|---|---|---|---|
| 1,572,263 A | * | 2/1926 | Ash | |
| 3,470,846 A | * | 10/1969 | Tillay et al. | |
| 4,316,554 A | * | 2/1982 | Lloyd | 244/137 R |
| 4,666,767 A | * | 5/1987 | Von Kohorn et al. | |
| 4,979,673 A | * | 12/1990 | Wilk | |
| 5,078,076 A | * | 1/1992 | Chestnut | 221/227 |
| 5,645,844 A | * | 7/1997 | Henderson et al. | |
| 5,839,221 A | * | 11/1998 | Ron et al. | |
| 6,339,897 B1 | * | 1/2002 | Hayes et al. | |
| 6,372,241 B1 | * | 4/2002 | Leonhardt et al. | |

* cited by examiner

Primary Examiner—Galen L. Barefoot
(74) Attorney, Agent, or Firm—Mark C. Jacobs (57) ABSTRACT

A system for the dissemination of pheromone bearing carrier substrates which includes an airplane/helicopter mountable carrier substrate dispenser, the actuation for release of the carrier substrates loaded into the dispenser being controlled from the cockpit of the plane/helicopter. Each carrier substrate has one A member card and at least one B member card released upon actuation of the dispenser, for disposition of the carrier substrates within treetops, where the pheromone will be released automatically from the substrate of the card to dissipate into the ambient air. The released pheromone acts to confuse male members of a particular pest insect, such that the males are impeded in their efforts to locate females of that specie who would also be disseminating pheromone, to thereby interfere with the mating cycle of such pest insects.

25 Claims, 8 Drawing Sheets

MULTI-CARRIER PHEROMONE CARRYING SUBSTRATE DISPENSER, APPARATUS DISTRIBUTION SYSTEM

FIELD OF THE INVENTION

This application pertains to a carrier substrate to be placed in trees either from the ground or preferably from the air, which carrier substrate has disposed thereon a chemical attractant for specific pests which attractants inhibits or disrupt the mating of the pest. The substrates are to be disposed in a multi-carrier dispenser apparatus for delivery to a specific situs. Certain substrates carry a pheromone delivery vehicle that can be in one of several formats.

BACKGROUND OF THE INVENTION

The thrust of the biology aspect of this application pertains to pests known as the codling moth, which moth can reek havoc upon fruit and nut trees.

The female codling moth attracts males in order to reproduce by releasing minute amounts of pheromone. The male detects the pheromone and flies upwind through the pheromone plume to locate the female. This pheromone is called codlemone and has been synthesized both in this country and Japan for many years. The synthesized pheromone has been used in traps to act as a lure or bait to attract male moths. In such a manner, monitoring of the codling moth population can and has transpired.

The object of monitoring the codling moth population is to regulate the population to avoid damage to commercial fruit orchards. The reduction in the codling moth population is achieved by interfering with the mating process of the moth. In order to confuse the male moths, growers place pheromone dispensers in trees; usually by hand up till this invention, in large quantities to inhibit the males from finding the females. The dispensers release several thousand times more pheromone than is released by the female codling moth. Exposure to such high concentrations confuses the males and thus limits their ability to detect the females at the optimal time for mating of that specie.

Currently, pheromone dispensers are placed in trees by hand. Such a practice presents several problems. These include the high cost of distribution, reliance on unskilled labor, and the physical fact that to be effective, the dispensers must be placed in the upper part of the tree to be biologically effective. Such is often not achievable by hand as many fruit trees grow to heights of more than thirty feet tall.

It is a first object of this invention to provide a new carrier substrate dispenser for pheromone, which is used to frustrate mating of a specific pest.

It is a second object to provide a pheromone carrier substrate that can be disposed in trees from both the air and land.

It is a third object to provide pheromone carrier substrates that have instantly available pheromone, as well as carrier substrates that have timed-release pheromone sources thereon.

It is fourth object to provide a uniquely configured pheromone carrier substrate, which can be distributed from any of several modes.

It is a fifth object to provide a distribution apparatus that can be mounted on a helicopter body or a plane's wing or body for the distribution of pheromone carrier substrates.

It is a sixth object to provide a unique carrier substrate that includes a plurality of surfaces for the deposition of pheromone.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIGS. 20 A, B, and C are perspective views of several of the notification carrier substrates of the prior art used with the prior art dispenser of FIG. 1.

DESCRIPTION OF THE PREFERRED EMBODIMENT

Figures 1, 2:
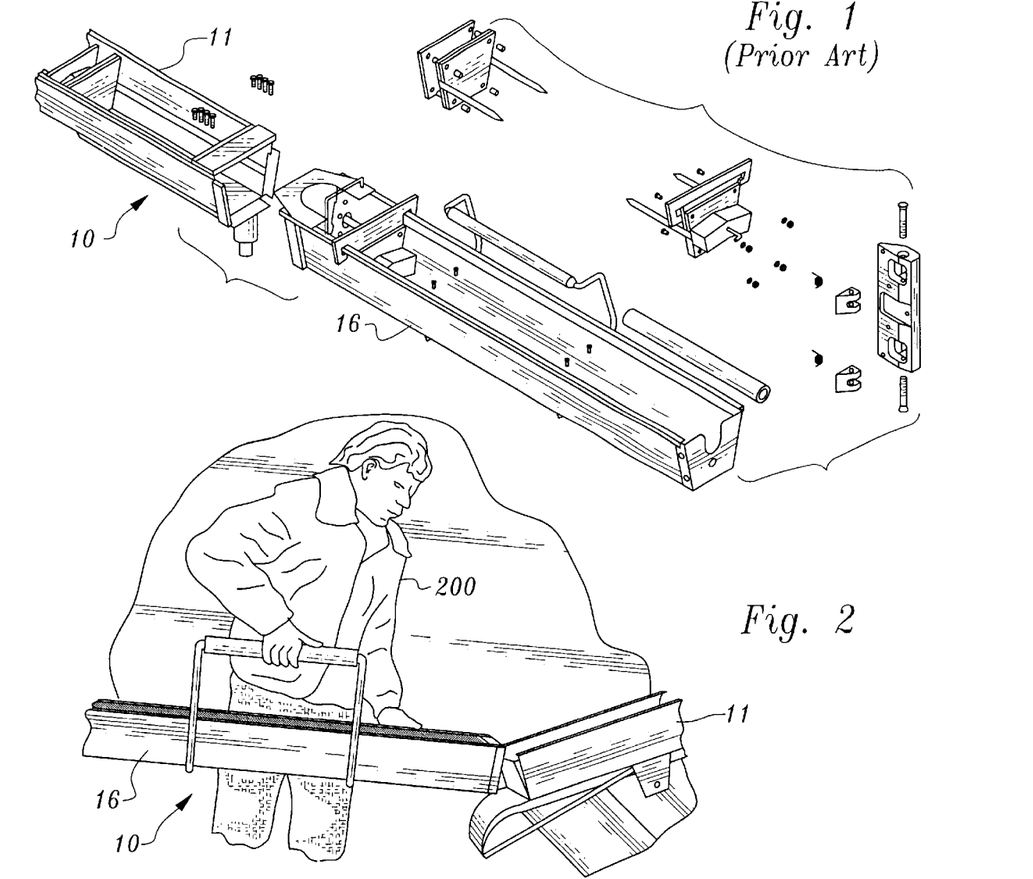
FIG. 1 is a perspective view of a prior art carrier substrate dispenser, which has been modified to achieve the dispenser of this invention. Also shown is the prior art carrier substrate loader of the prior art, which can be used with the dispenser of this invention.
FIG. 2 is a perspective view depicting the main step in the loading of carrier substrates for distribution from the air using a loader apparatus.
Figure 3:
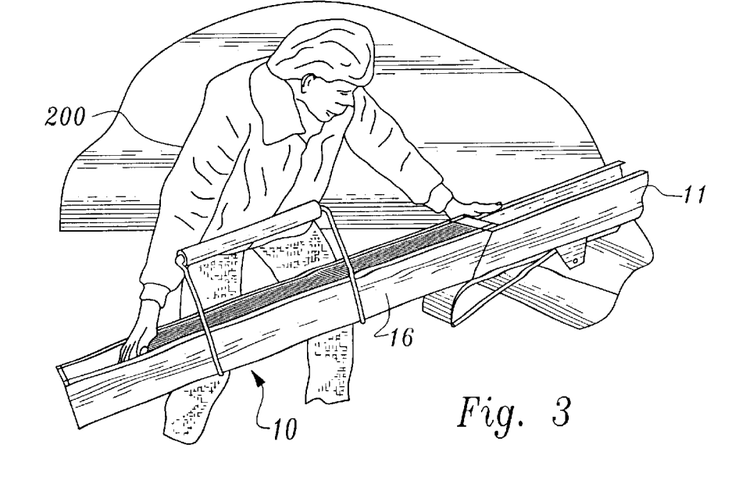
FIG. 3 is a right side top perspective view of the modified carrier substrate dispenser apparatus of this invention being loaded with carrier substrates for distribution from a loader.
Figure 4:
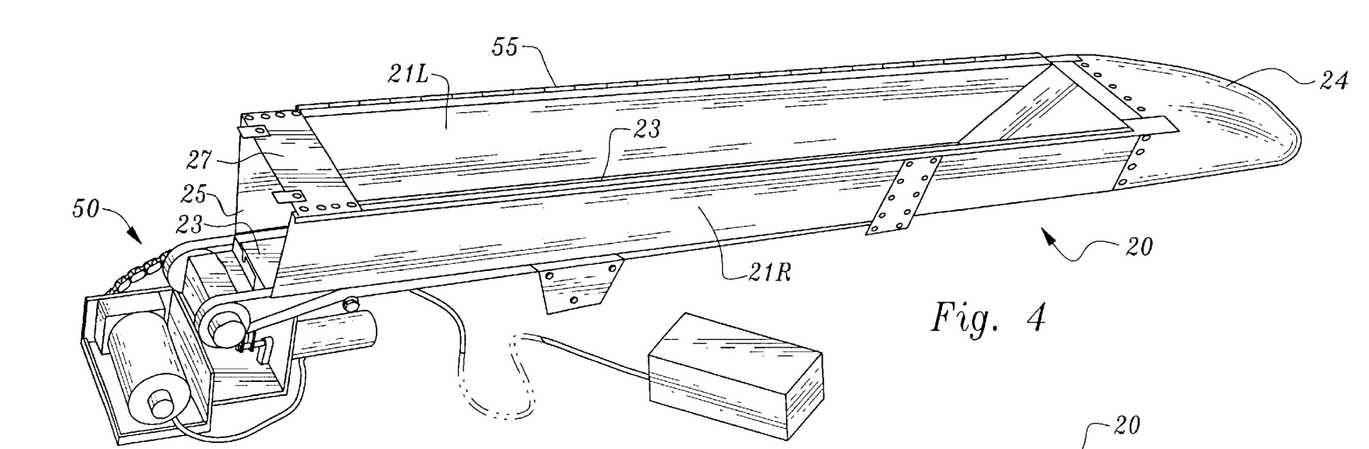
FIG. 4 is a right side top perspective view of the modified distribution apparatus of this invention.
Figure 5:
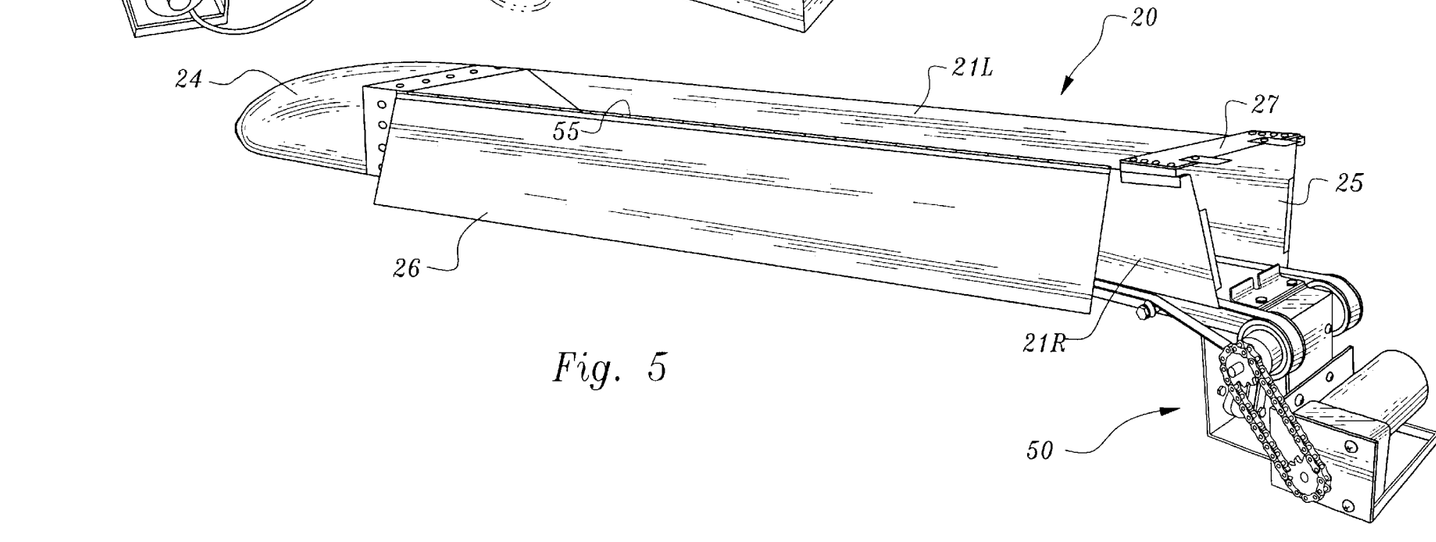
FIG. 5 is a left perspective view of the modified distribution apparatus of this invention, with the top door open.

In FIG. 1, there is shown the carrier substrate loader and carrier substrate dispenser of the prior art. This dispenser 10 having a body 11 is mounted upon an airplane wing, as seen in FIG. 3. Signal carrier substrates are distributed from the dispenser and broadcast into the air for disposition into trees. There are various types of prior art signal carrier substrates, three of which are seen in FIGS. 20A, 20B and 20C, and are referred to as items 19A, 19B, and 19C.

Prior art card 19A is described by the manufacturer, Automatic Flagman, Inc., in a brochure as a "single white carrier substrate that has a ten-foot streamer attached to a standard carrier substrate card. The streamer is an alternatingly folded piece of white paper. The trapezoidal shaped card acts as the weight to allow the carrier substrate to settle into a tree that way an air sprayer pilot can determine what areas have or have not been sprayed during the course of the day. A multi-acre ranch or farm can be divided into zones marked by these carrier substrates".

The prior art carrier substrates also come in fluorescent colors as is seen in FIG. 20B. In all other aspects the carrier substrates are the same and are used for the same purpose. These are best used in snowy areas or on light colored crops, such as wheat.

Double-ended carrier substrates have a weight shaped similarly to a single panel of the streamer disposed at the rear as well as having the trapezoidal card at the front. See item 19C in FIG. 20C. The extra weight causes the carrier substrate to drape over the limbs of a branch after it leaves the dispenser 10 in a manner similar to my units shown in the trees of FIG. 19. Reference is made to U.S. Pat. Nos. 3,428,019, and 3,470,846 owned by the Automatic Flagman Co. of Walla Walla. These patents disclose and claim the drop marker system in its entirety including the prior art dispenser. The loader or re-loader as it may also be referred to and the streamer markers, discussed elsewhere herein, are disclosed and claimed in U.S. Pat. No. 5,078,076 and depicted in FIGS. 1,2, & 3. The earlier patents are incorporated herein by reference in order to limit the amount of detail of the prior art that needs to be recited herein.

The device to load the various prior art carrier substrates into the dispenser covered by the aforesaid U.S. patent is depicted in both FIG. 1 and FIGS. 2 and 3. Loader 16 is shown in FIG. 2 being brought approximate the dispenser such that it can be inserted therein to load the carrier substrates. Whereas in FIG. 3, items in the loader 16 are being loaded from the dispenser by the man 200. It is the dispenser of the three million series patents that served as the inspiration for the modified dispenser of this invention. The loader shown in FIGS. 1, 2, and 3 is substantially unchanged by applicant. That is, it will accept the new pheromone double-ended carrier substrates of this invention for loading into the modified dispenser for air distribution. So too, the carrier substrates of the prior art served as the inspiration for the new useful and unobvious pheromone carrier substrates of this invention.

The reader's attention is now turned to FIG. 4, where the modified dispenser 20 of this invention is seen from the right side. Nose 24, and the two sidewalls 21L and 21R are the same as found in the prior art unit as is the cross-strap 27 and the bottom wall or base 23. The dispenser of this invention also has a substantially open rear 25, note however from FIG. 8, the opening is covered over in part by a pair of opposed inwardly disposed carrier substrates 28 which are spaced down from the cross strap 27 and spaced up from the bottom. Collectively the electromechanical aspect of this invention designated 50 is also seen in FIG. 4 but will be discussed in detail infra with respect to FIGS. 8, 9 and 10 wherein it is seen in close-up. A careful viewing of this figure reveals the presence of a full-length piano hinge 55 that holds the hinged top door 26. See also FIG. 9. In FIG. 5, a left side perspective view, the swing top 26 is also seen secured in place by the piano hinge 55. Thus it may be deduced that from the outside, the prior art dispenser 10 and the modified dispenser 20 of this invention appear quite similar from a distance but for the extra electromechanical features to be discussed.

This resemblance is born out by reference to FIG. 6 wherein the apparatus 20 is seen mounted on the wing 181 of plane 180. See also FIG. 7 which shows the modified apparatus 20 ready for loading disposed upon wing 181 of the personal aircraft of the inventor.

FIG. 8 depicts a rear perspective view of the dispenser of this invention as well as the electromechanical portion 50 of this invention.

In the lower right area of the figure, there is seen a motor mount 41 which has abase 41A, a left sidewall 41B and a rear wall 41C. The motor mount is open in back and on the right side (Front and back are relative to the nose 24—deemed the front of the apparatus). A motor 40 is mounted to the housing by bolts 60, one of which is visible. A shaft 39 protrudes though an unmarked opening in wall 41B and carries a gear 38. An endless chain 37 rides on gear 38 and upon a second gear 36 disposed distant from the first gear 38, upon a shaft 33. Also disposed on the shaft 33 but inwardly along the length thereof is a pulley wheel 34. A pulley belt 45 rides upon wheel 34 emanating from a location external to the left sidewall 21L and extending inwardly of the dispenser 20 beyond the pulley wheel 34, more on this pulley belt infra.

Pulley shaft 33 is disposed within a pulley housing 32. This pulley housing has a rear wall 32A, abase 32B, a front wall 32C and atop wall 32D, which is of less depth than base 32B. Top wall 32D abuts the L-stop 29 which retains the carrier substrates therein prior to ejection by the plunger 81 disposed adjacent cutout 30 of the L-plate. The plunger is best seen in FIGS. 10 & 11. The plunger lifts the carrier substrate's card over the upstanding section of the L-stop. The L-stop 29 is retained in place by bolts 31, two of which are visible in FIG. 8. Mounts 41 and 32 may be made of aluminum sheet Mount 41 is seen to be bolted along front wall 41C, to rear wall 32A of housing 32 by bolts 62.

This perspective view particularly points out the presence of the rear opening flanges 28 that extend inwardly to retain the carrier substrates from being prematurely dispensed. The spacing upwardly of these flanges 28 is slightly greater than the elevation of the upstanding portion of the L-shaped stop 29. The positioning of the upstanding portion of the L-stop 29 is normal to the rear edges of the two sidewalls 21L and 21R of the dispenser 20.

The reader's attention is also called to belt idler pulley for the feed belt 43 mounted outwardly from the elongated bar 44L which forms part of the base of the dispenser. Bar 44R is not seen in this view.

Instead of a solenoid as used in the original Automatic Flagman apparatus, an electric motor 42 with a crank shaft type drive or a rotary solenoid 42A is configured to periodically actuate the plunger 81 disposed at a right angle thereto in order to kick the carrier substrate card stock up and out of the dispenser as will be described in detail infra.

Figure 9:
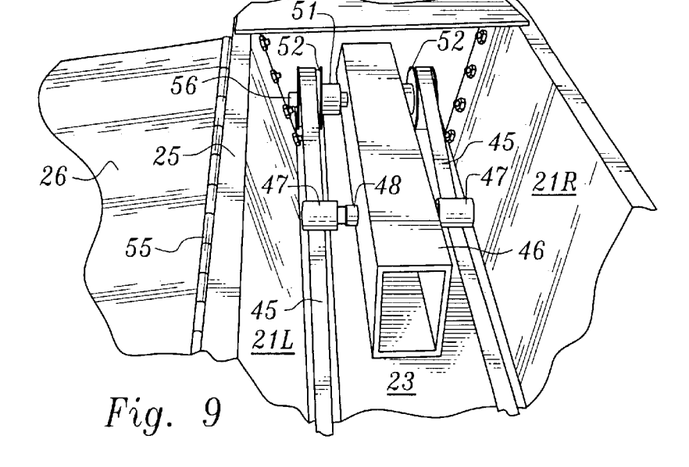
FIG. 9 is a top perspective view of the forward interior end of the apparatus of this invention.

In FIG. 9, a fixedly positioned rectangular tube, also of aluminum is shown disposed spaced slightly from the base 23. This rearwardly disposed elongated tube carries a pair of opposed pulley tensioners 47, a left one and a right one, both spaced rearward of the front end of the apparatus. These tensioners 47 are seen to be spaced by spacers 48, and they have the pulley belts 45, passing beneath them yet in contact therewith. A forward pulley wheel 52 on each side of the square channel 46 is disposed forwardly toward the nose of the dispenser upon a shaft 56. The pulley wheels 52 are spaced from the channel 46 by spacers 51 per FIG. 8.

Figure 22:
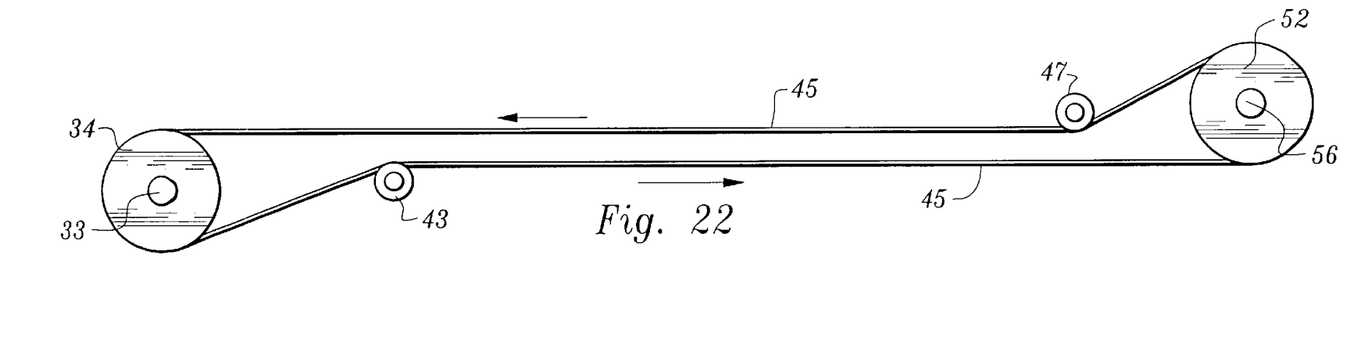
FIG. 22 is a diagrammatic explanation of the conveyor belt movement with the pulleys employed in the apparatus aspect of this invention.

Reference is made to FIG. 22, which is a diagrammatic explanation of the movement of the pulleys utilized in the apparatus of this invention.

Figures 6, 7, 8:
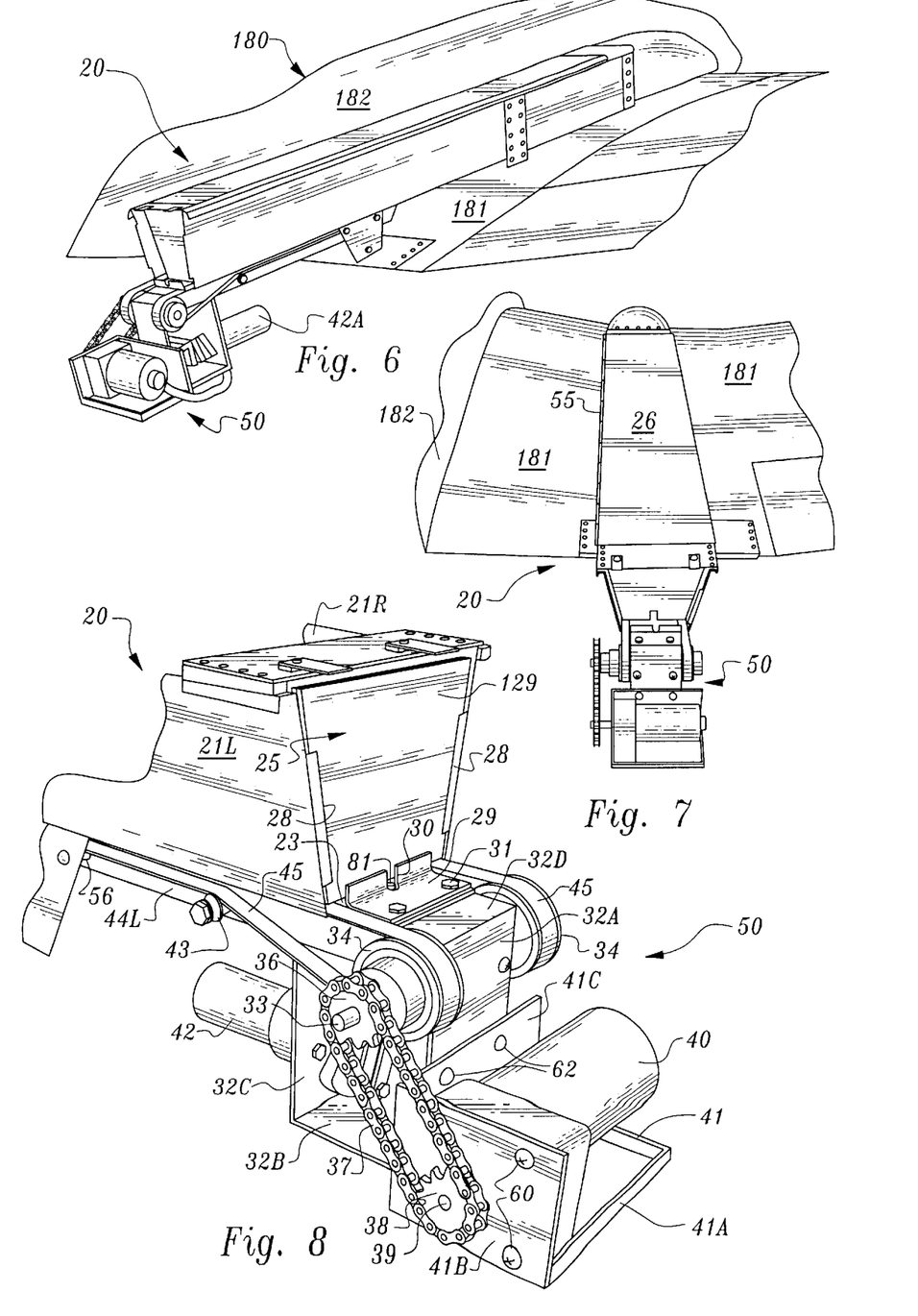
FIG. 6 is a right perspective view of the apparatus of this invention mounted upon an airplane wing.
FIG. 7 is a rear perspective view of the apparatus mounted on a plane's wing.
FIG. 8 is a close-up perspective view of the electromechanical operations aspect of the dispenser of this invention.

From the diagrammatic view FIG. 22, it is to be understood that the arrow on the belt serves to indicate the direction of travel of the two belts, one on each of the two sides of the apparatus. Reference is also made to FIG. 8. With reference to the floor 23, the belts (pulley) 45, travel from the back of the apparatus—the open end, toward the front on the underside of the floor. As the belt comes up from under the pully wheels 52, each of them wraps up and over the top of the wheel 52. The belts each then travel under their respective idler pulley 47, and from the idler pulley 47 each belt is directed toward the exit opening 25 at the back of the apparatus 10. The pulley belts 45 pass around and over the top of their respective pulley wheels 43, best seen in FIG. 8, over pulley 52 within the nose of the apparatus, adjacent wall 44L, but underneath wall 21L and then over external idler 56 and through an opening, not seen into the interior of the apparatus.

The maintenance of the belt in a single plane transpires because wall 44L is recessed in from the sidewall 21L, beneath floor 23.

The piano hinge 55, which is attached to the dispenser body and is used with swing away door or top wall 25, is clearly seen in FIG. 8. The reader is now directed to FIG. 10. Here the door 26 is in the open position to reveal the unloaded condition of the modified dispenser 20. Optionally attached to the cross strap 27 are a pair of laterally spaced flexible leather fingers 53 which are mounted by screws 54 to the cross strap 27 that closes off the extreme end of the top opening even when the door is closed. These leather fingers tend to eliminate any static electricity from each deployed carrier substrate card as it is ejected. These fingers also inhibit the departing A card 126 from being ejected upwardly by first absorbing some of the release energy and then forcing the card to change to a horizontal trajectory rather than an upward one on departure as initiated by the plunger 81.

Figures 10, 11:
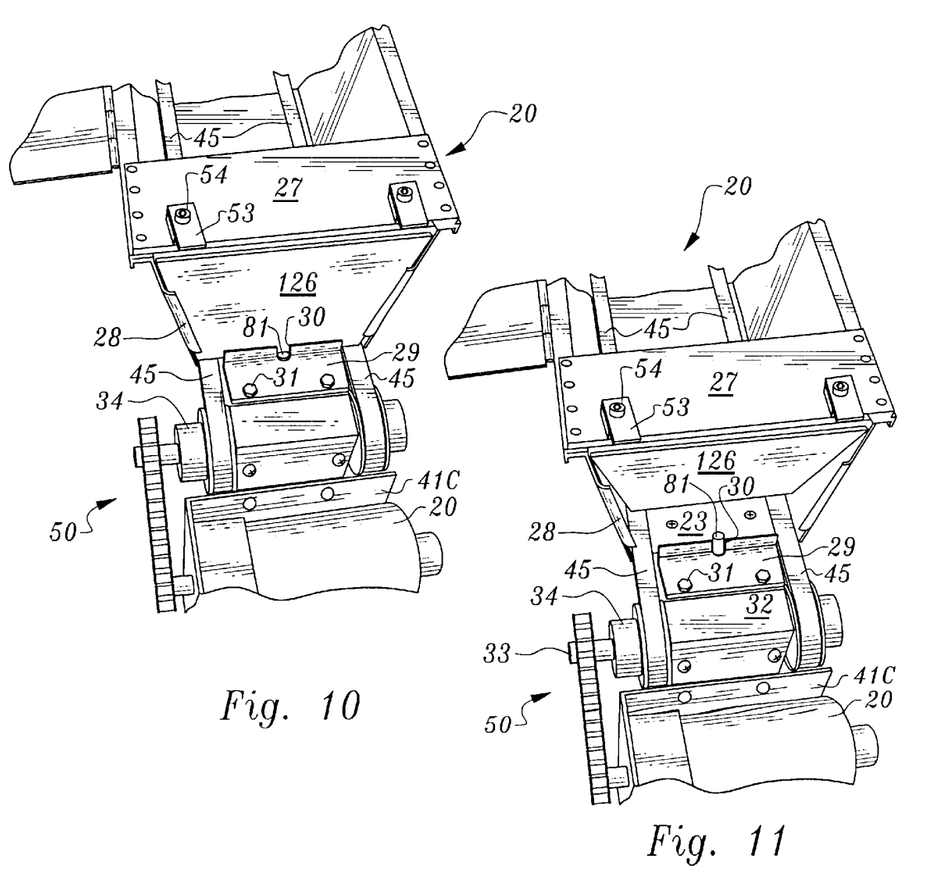
FIG. 10 is a top rear perspective view of the apparatus of this invention and of the electromechanical control system thereof.
FIG. 11 is a close-up rear perspective view similar to FIG. 10.

All other aspects of the electromechanical operation seen in FIG. 10 have already been discussed.

FIG. 11 is quite similar to FIG. 10 in perspective. Here however, the A card of the carrier substrate of this invention, 126 is seen purposely set at an angle disposed upon the two pulley belts 45 prior to ejection by the here upstanding plunger 81. In this view the door also known as the swing away top wall 26 is seen to be in the open position. Only a small top section of the B card 127 is visible in this view.

Figure 12:
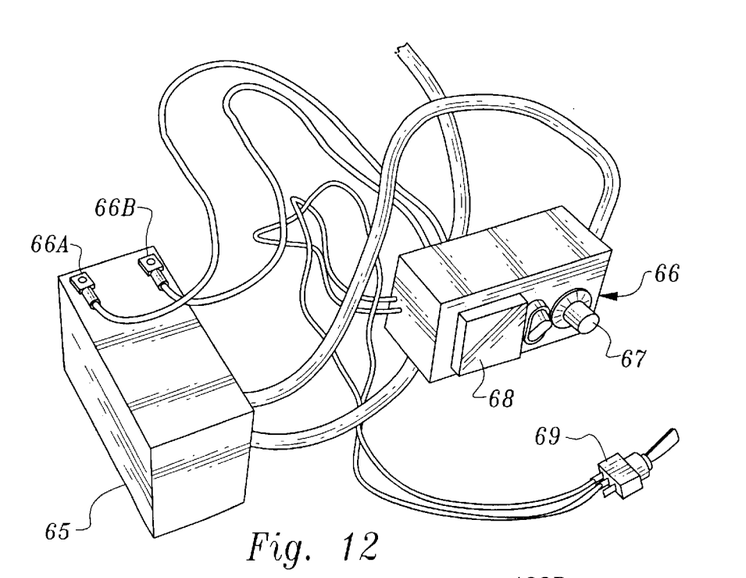
FIG. 12 is a perspective view of the battery and speed control components of the control system hereof.

From a viewing of FIGS. 8, 9, and 10 one can understand that the motor 40 when electrically actuated turns the shaft 39, which in turn rotates the gear 38 with the chain engaged thereto. The chain then drives the forward gear on shaft 33 to move the pulleys. The belts carry the cards toward the aft end of the apparatus, and hold the cards in place, so that the plunger can kick out the A card of each combination. AB card system. The operation of the plunger 81 however is controlled solely by the actuation of the actuator connected thereto. In FIG. 12, a 12volt battery has two leads 66A and 66B connected to the terminals thereof. The other end of electrical lead 66A is connected to a control box 66, as is the other end of lead 66B. The controller 66 has a voltmeter 68 thereon and a potentiometer 67 to control then motor speed of the motor used to move the actuator. Also shown is a toggle switch 69 hitch serves to turn the system on and off. These components shown here are normally found in the cockpit of the airplane or helicopter, but are shown here for display only and for ease of understanding of the reader.

Whereas the discussion has referred to the use of a motor 42 to operate a cam to activate the plunger (the combination of plunger and cam being a plunger means) reference is made to FIG. 6 which shows the presence of a slightly different element; namely element 42A which is a rotary solenoid. This solenoid 42A rotates about 25 degrees such that I the rotated position it raises the plunger to impact the "A" card. While the rotary solenoid is in the at rest position, the plunger recedes. The connection between the solenoid and the plunger is a pivoting arm, and the combination of plunger and pivoting arm is also a plunger means. Both of these plunger means are commercially available.

THE CARRIER SUBSTRATE ASPECT OF THIS INVENTION

Figure 13:
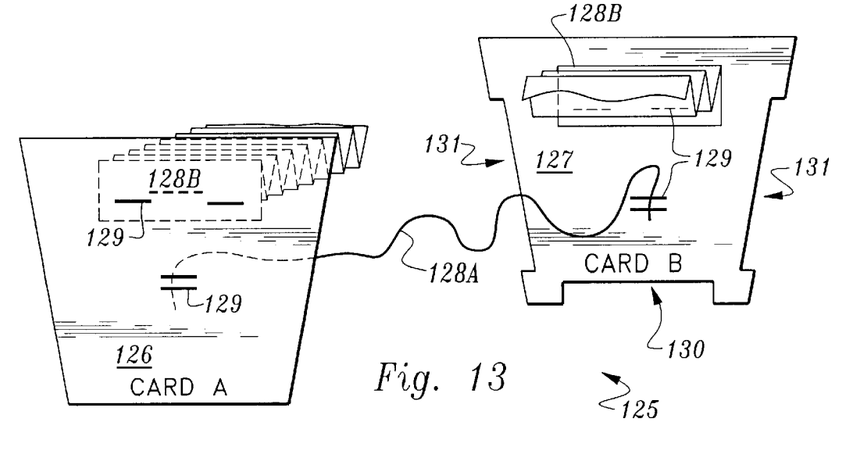
FIG. 13 is an elevational view of one version of the pheromone carrier substrate of this invention. For ease and convenience, the rear face of the A card is seen and the forward face of the B card is seen.

The reader is now directed to FIG. 13. Here the A card is seen at the bottom of the figure and closely resembles the card stock stiffener of the prior art carrier substrates referred to in any and all of FIGS. 20A, 20B and 20C. The preferred version of the card system 125 of this invention includes a front or A card 126 Card A, 126 is seen to be trapezoidal, and sized slightly smaller than the width and height of the opening of the rear of the dispenser 20. Since the opening includes the two flanges 28, it is seen that the A card 126 will be retained in the dispenser by the two flanges 28. Here as noted supra, the rear face of the card 126 is seen. Card A 126 may be connected to card B by one of two modes. The first is a simple string such one made of cotton or polyester or nylon and which are readily available and designated 128A. The string is attached to the card 126 by a pair of common staples 129. String 128A is also shown attached to the rear face of the B card 127, to be discussed shortly.

It is within the scope of this invention to have the string connecting the A and B cards serve as the vehicle for pheromone delivery. Such string could be dipped in a pheromone containing solution, much like a perfume tester strip of card stock, and then permitted to let the pheromone solution volatilize off the string. It is also within the scope of the invention to use pheromone emitting tubules, which are flexible thin tubes such as those made by Pacific Biocontrol Corporation and sold under the brand name Isomate, from which flexible tubules pheromone can be emitted into the atmosphere surrounding the leaves or branches where the string comes to rest in a tree after it has been ejected from the apparatus 10.

Indeed while staples are shown as the mode of attachment of the string to the A and B cards, a strong adhesive or even sewing stitches maybe employed as a means to secure the string to the cards.

The alternate mode of securing card A to card B is to use a ribbon two to three inches wide, or a folded paper streamer such as 128B shown in discontinuity on both the reverse face of card A and the obverse face of card B.

Card B, 127 is configured different from card A. The B card includes two opposed side notched out area 131 which are sized elevationally and laterally to avoid hitting the two side flanges 28.

A bottom notch 130 is also removed from Card B such that a card moving rearwardly from the dispenser will clear the upstanding portion of the L-shaped stop 39. Thus neither the flanges nor the L-stop will interfere with the egress of the B card, but both will impede the travel of the A card.

Figure 14:
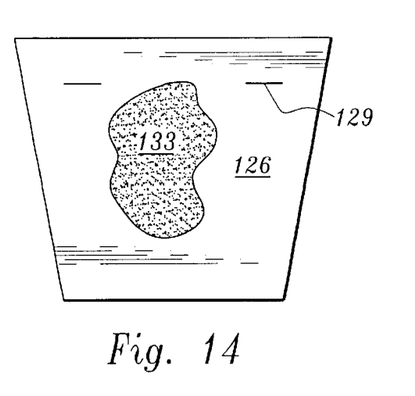
FIG. 14 is an elevational view of a blob of pheromone upon a pheromone carrier substrate of this invention.
Figure 15:
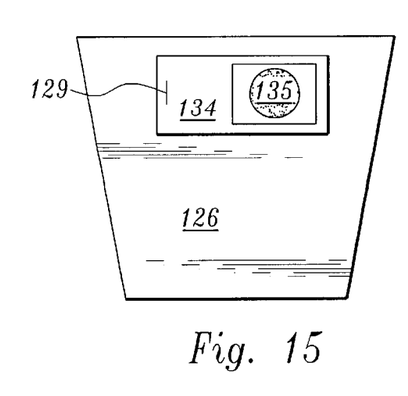
FIG. 15 is an elevational view of a timed-release pheromone carrier substrate according to this invention.

In FIGS. 14 and 15 the obverse face of an A card is shown but each A card 126 has pheromone disposed in a different manner. In FIG. 14 a blob of pheromone deposited in a waxy base is hand spread on the A card with a brush or narrow trowel and allowed to harden. Such pheromone waxes are believed to be available for both the codling moth and other pest insects in both wax and paraffin emulsions from at least one commercial source. Pheromones in little packets are available under the brand name Checkmate. Short lengths of Isomate(brand) pheromone containing ropes can be attached to either or both sides of "A" and "B" cards, joined by any means.

In FIG. 15, the pheromone is purchased within the little packet 134 is stapled to the obverse face of the card 126 by more staples 129. Each packet includes a small membrane area through which the pheromone of the codling moth or other insect can be disseminated by permitting the pheromone to dissipate through the pores of the membrane. The packets 134 are shipped in sealed packets to avoid early dissipation of pheromone. Such packets with are available in the marketplace.

The operation of the replacement for the solenoid of the prior art,—that is the motor with cam drive for actuating the plunger, or the rotary solenoid and swing arm, is such that the plunger will hit every A card on the bottom and then recede while the B card is being dispensed. The plunger may be round as shown but there is no criticality in shape recognized at this time. Thus one having an elongated oval cross section or chamfered rectangle cross-section may also be employed.

Figures 16, 18:
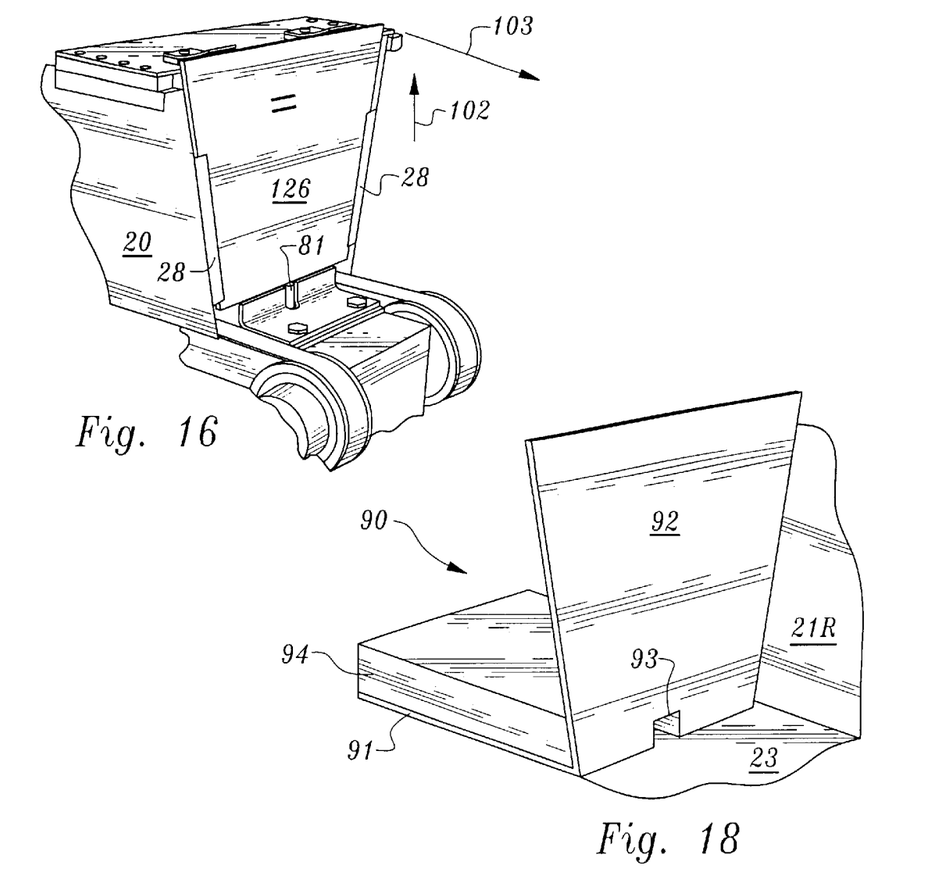
FIG. 16 is a diagrammatic view of the aerial pattern of the release of an "A" card of the carrier substrate of this invention.
FIG. 18 is a perspective view of the pusher used in this invention for presentation of a carrier substrate for ejection from the dispenser.
Figure 17:
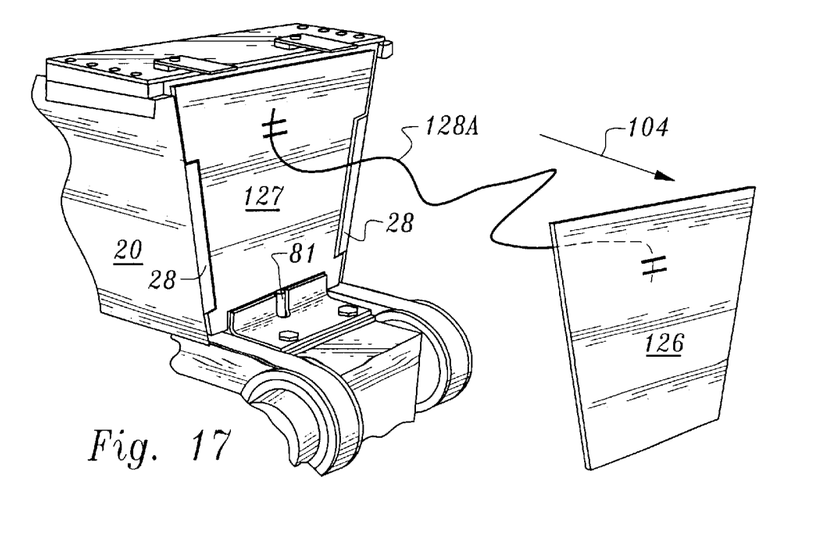
FIG. 17 is a diagrammatic view of the aerial pattern of the release of a "B" card of the carrier substrate of this invention.

In FIGS. 16 and 17, the motion of the emerging cards A and B is depicted graphically. The plunger 81 when activated impacts the bottom of card 126, which is retained within the dispenser by flanges 28. The card flies upwardly as per arrow 102, out of the dispenser as it absorbs energy from the plunger 81. Once freed from the confines of the dispenser 20, it moves rearwardly with the air flow, which in actuality is rearwardly relative to the moving apparatus 10, as per arrow 103. Card B as shown in FIG. 17 however has a different trajectory. This is due to the fact that the card is NOT retained by flanges 28 and is therefore able to free fall from the dispenser. As seen, it is attached to the rear of card 126 and just falls rearwardly per arrow 104 toward the viewer. In FIG. 18 there is shown the pusher mechanism 90 that urges each card set rearwardly in the dispenser 20. The pusher includes a trapezoidal plate 92 attached at a 90° angle to a base 91. Both of these elements are made of sheet aluminum. A weight 94, such as of nylon or other material, is attached to both the vertical trapezoid 92 and the horizontal base 91. A cutout 93 is provided in all of the upstanding plate 92 and the base and the weight such that after the last card set is ejected, the plunger will still be able to rise freely without impacting a piece of metal or plastic and become damaged when this pusher mechanism is totally extended. Adjacent the opening the pusher mechanism is retained from falling out by the L-shaped stop 29. The pusher mechanism rides rearwardly toward the viewer, along the two pulley belts 45 to urge each card set into position toward the rear opening for dispersal.

Figure 19:
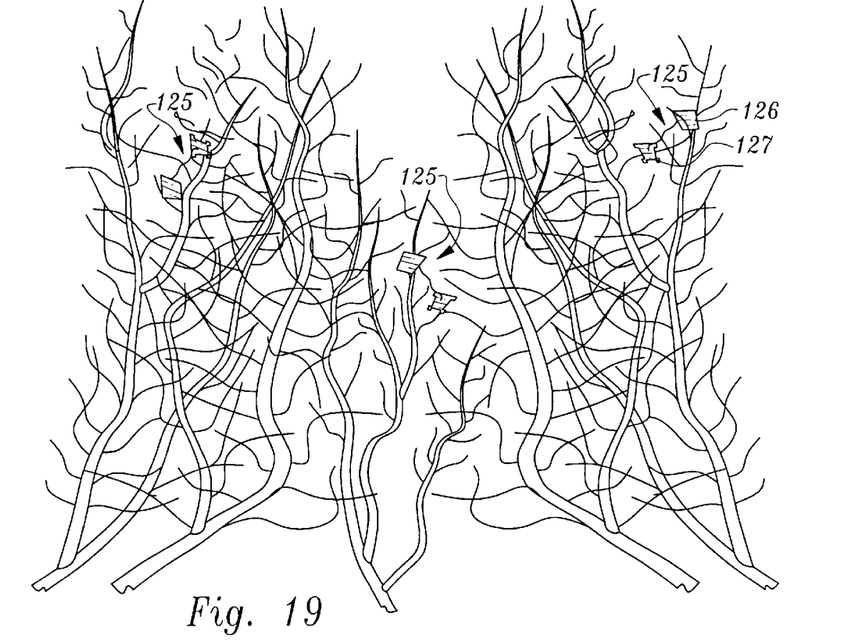
FIG. 19 is a bottom view of a series of trees with carrier substrates of this invention disposed therein.
Figure 20A:
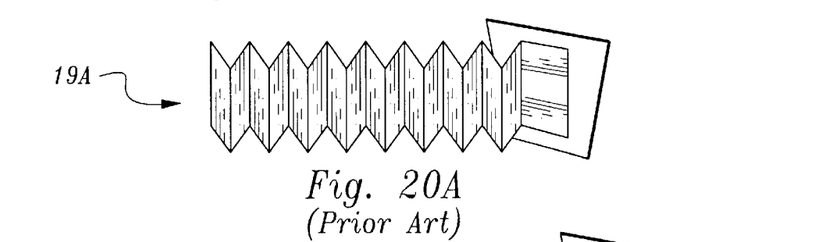
Figure 20B:
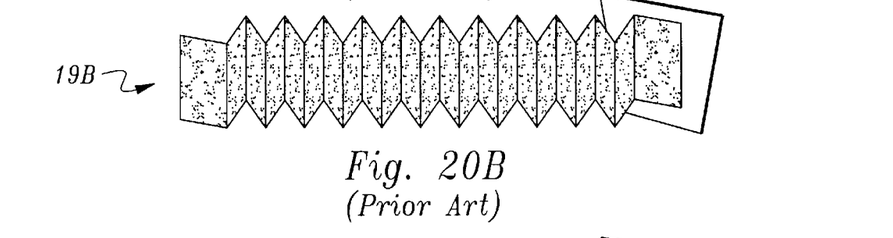
Figure 20C:
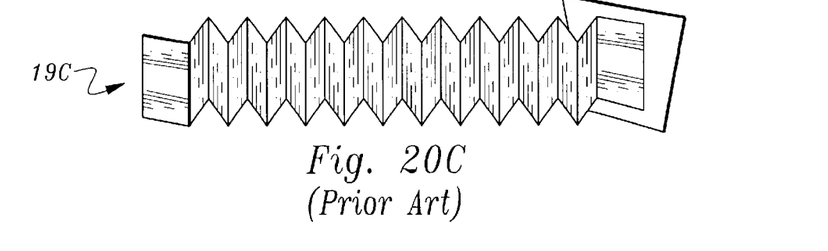

Reference is again made to FIG. 19. When the card sets are distributed from the apparatus of this invention, they are intended to land in the top of a tree or plurality thereof. Thus one can see card sets 125 draped over branches of the trees of this figure.

Figure 21:
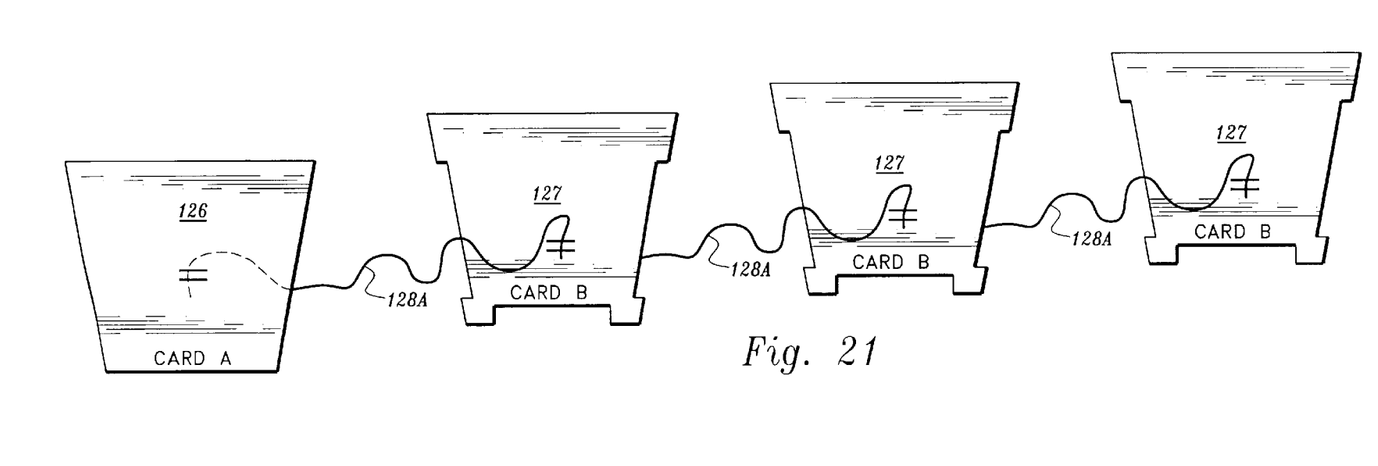
FIG. 21 is a side elevational view of a variant form of the carrier substrate of this invention.

While reference has been made to each card set having an A member and a B member, it is within the scope of this invention to provide card sets that have a single A member and several B members attached thereto by individual strings or ribbons in the manner shown in close-up in FIG. 13. In such an instance, the first card would be an A, 126 and all the others would be B cards. An example of this is depicted graphically in FIG. 21.

It is believed that each card of a multi-card set should have its own pheromone supply thereon, though such is not actually required.

The dispersal of the card sets 125 containing pheromone will and has confused codling moths in the areas of specific trees as they are unable to discern the location of the true female of the specie and as such the mating cycle which lasts but briefly is interrupted or at least limited. This concept of interfering with the mating cycles by not allowing the male to find the female can be employed with other pest insects for which pheromone is available in the marketplace. For faster loading of the card sets, i.e., the paired carrier substrates, the loader of U.S. Pat. No. 5,078,076 may be employed in the same manner as recited in the patent for the signal flags of that the earlier patents of Automatic Flagman.

While the carrier substrates as described herein have been stated to be utilized as pheromone carriers for delivery to a tree site, it is also within the scope of the invention to use a combination of chemicals for annihilating a specific pest. Thus, one card could carry a specific pheromone while the other card has a timed-release insecticide pod or membrane covered sack disposed thereon. In the alternative, each card could have a mix of pheromone and insecticide disposed thereon. Thus, instead of merely disrupting the mating cycle, the attracted specie would be killed by the localized insecticide. Such a combination of attack would greatly reduce the amount of pesticide needed to kill off a quantum of a specific pest. Since timed-release pesticides are known, it would be within the skill of art to provide a lure and kill system for a specific pest for airborne release onto crops using the carrier substrates of this invention.

While the discussion above has centered on delivery of the pheromone bearing card(s) to trees, applicability is also seen in using this procedure for row crops, such as but not limited to corn, beans, and cotton among others.

As noted supra, upon being released from this inventive apparatus, the "A" card moves upward and over the flanges 28 per FIG. 8. The "B" card is configured to move directly rearwardly and as discussed, it clears flanges 28. Should flanges 28 be reconfigured in any fashion, it is within the skill of the artisan to change the configuration of the notched out areas 131 to clear any change in the flange configuration.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A system for the dissemination of pheromone bearing carrier substrates which system includes, an airplane/helicopter mountable carrier substrate dispenser, the actuation for release of the carrier substrates loaded therein being controlled from the cockpit of the airplane/helicopter; whereby a carrier substrate, having one A member card and at least one B member card is released upon actuation of the dispenser, for disposition of said carrier substrate within treetops or plant where the pheromone therefrom will be released automatically from the surface of the cards to dissipate into the ambient air and said pheromone will confuse male members of a particular pest insect such that the males are impeded in their efforts to locate females of that specie who would also be disseminating pheromone and thereby interfere with the mating cycle of such pest insects.

2. The system of claim 1, wherein the dispenser has a rear opening and a motor connected to a plunger means, which includes a plunger that releases the "A" member card from the dispenser by impacting the A member card; and said plunger does not impact the "B" member card.

3. The system of claim 1 wherein a plurality of carrier substrates each having one "A" member card and at least one "B" member card, which are loadable into said dispenser;

said dispenser includes a pair of spaced belts upon which the carrier substrates travel toward a rear opening in said dispenser.

4. The system of claim 3 wherein a motorized cam operated plunger releases the carrier substrates;

same motor is connected to said belts to urge said carrier substrates toward said rear opening for impact by said plunger.

5. The system of claim 1 wherein said dispenser is an elongated container having a pair of spaced sidewalls, a bottom wall, a hinged top, an open rear, and flanges disposed inwardly.

6. The system of claim 1 wherein the carrier substrate dispenser has an interior cross-section complementary to the cross section of the A member card, and wherein a pair of spaced moving belts moving toward the rear opening of said container, urge the carrier substrates toward the plunger for impact upon the A member card.

7. In the system of claim 1 wherein the A member card present is of a trapezium shape, and each B member card present has a trio of cutouts, one on each angled side and one on the bottom surface thereof, said card members of said substrate being attached to each other from the obverse face of one card to the reverse side of the other.

8. The system of claim 1 wherein the dispenser includes a card mover disposed in said container and which has a base and an upstanding member, coupled to means to move said card mover toward the rear opening to urge the carrier substrates toward said opening.

9. The system of claim 1 wherein the plunger means comprises a plunger and cam, and the means is connected to a motor.

10. The system of claim 1 wherein the plunger means comprises a plunger and swing arm, and the means is connected to a rotary solenoid.

11. A dispenser, mountable upon an airplane or helicopter, for the distribution of pheromone bearing carrier substrates, which dispenser is an elongated container, having a closed nose, an open interior complementary in cross section to the cross section of a pheromone bearing carrier substrate having an A member card to be disposed therein, which interior is rearward of said nose and defined by side walls and a generally horizontal bottom wall; a hinged top wall covering over the interior of said container, a rear opening, a cam operated plunger connected to a motor having a shaft, which motor is disposed below the plane of the bottom wall, a pair of spaced moving belts mechanically connected to said motor shaft, to urge carrier substrates disposed within said container toward the rear opening, when said motor is actuated to cause said plunger to eject said carrier substrates.

12. The dispenser of claim 11 wherein the cross section of the interior and the opening are the same and the cross section is a trapezium.

13. The dispenser of claim 12 including a pair of inwardly disposed flanges mounted on the bottom wall of said container, and a single L-shaped stop extending upwardly into said rear opening to prevent unintended ejection of said A member containing carrier substrate.

14. The dispenser of claim 13 further including a spacer member having pulley tensioners thereon for said belts, disposed within said container.

15. The dispenser of claim 14 wherein the moving belts are disposed in part both within and outside of the container.

16. The dispenser of claim 13 wherein the plunger is disposed adjacent the L-shaped stop in line with said inwardly disposed flanges.

17. The dispenser of claim 13 including means mounted in said airplane or helicopter to control the timing of the actuation of said plunger and to activate said plunger.

18. The dispenser of claim 11 further including a card mover having a base and an upstanding member, and which rides on said belts within said container to urge said A member carriers toward said opening.

19. A carrier substrate for the delivery of pheromone, comprising at least one A card member configured for impact by a container mounted plunger, and at least one B member card connected to each other; the pheromone being carried by string connecting the A member to the B member card.

20. A carrier substrate for the delivery of pheromone, comprising at least one A card member configured for impact by a container mounted plunger, and at least one B member card connected to each other; the pheromone being carried by membrane containing packets attached to at least one of the card members.

21. A pheromone carrying carrier substrate for the delivery of pheromone comprising one A member of a trapezoidal configuration, and a plurality of B member cards of a slightly different configuration, each card being connected sequentially one to the next, for delivery to trees.

22. A process for inhibiting the mating of insects, which process comprises:

(a) distributing insect specific pheromone bearing carrier substrates which have means adapted to allow the carrier substrates to become tangled in tree tops and plant tops, into tree tops and bush tops of plants known to be subject to devastation by a particular insect, (b) permitting the carrier substrates to become entangled in the tree tops and plant tops and bush tops, from which carrier substrates the pheromone will exude into the air in the vicinity of the entangled carrier substrates to confuse males of that specific specie in their quest to find females of the specie, thus inhibiting propagation of the specie of pest insect;

wherein the pheromone bearing carrier substrates are dropped from a dispenser that is mounted on an airplane/helicopter, the distribution being controlled by a crew member of the airplane/helicopter.

23. The process if claim 22 wherein the carrier substrates are generally planar members, one of which is trapezoidal, and designated an "A" card and having an obverse face and a reverse face, and at least one other card which is designated a "B" card, each of which also has an obverse face and a reverse face, the first "B" card being connected to the reverse face of the "A" card, and any and all other "B" cards present being connected on their obverse face sequentially to the reverse face of a "B" card.

24. A carrier substrate for the delivery of pheromone, comprising at least one A member card configured for impact by a container mounted plunger, and at least one B member card connected to each other; the pheromone being disposed for exudation within the means used to connect the "A" card to the "B" card.

25. A pheromone bearing carrier substrate comprising at least 2 generally planar members, one of which is trapezoidal, and designated an "A" card and having an obverse face and a reverse face, and at least one other card which is designated a "B" card, each of which also has an obverse face and a reverse face, the first "B" card being connected to the reverse face of the "A" card, and any and all other "B" cards present being connected on their obverse face sequentially to the reverse face of a "B" card.

* * * * *